Aug. 27, 1940.   H. W. PRICE ET AL   2,212,955
PRESSURE DIFFERENTIAL OPERATED MOTOR
Filed Sept. 21, 1938    2 Sheets-Sheet 1
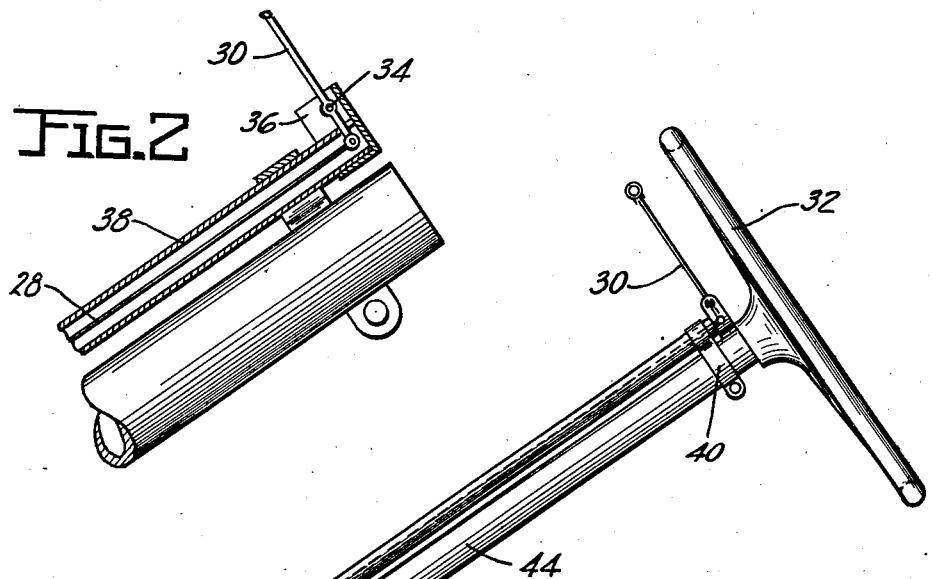
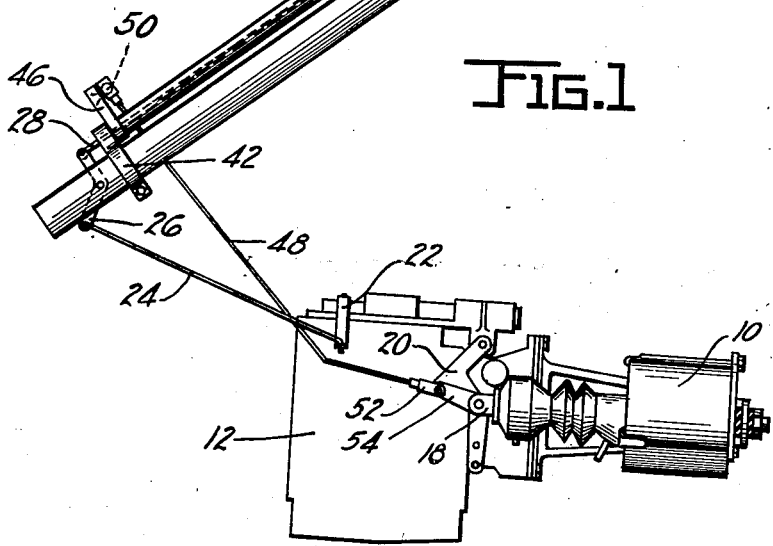
INVENTOR.
HAROLD W. PRICE
BY   EARL R. PRICE
ATTORNEY.

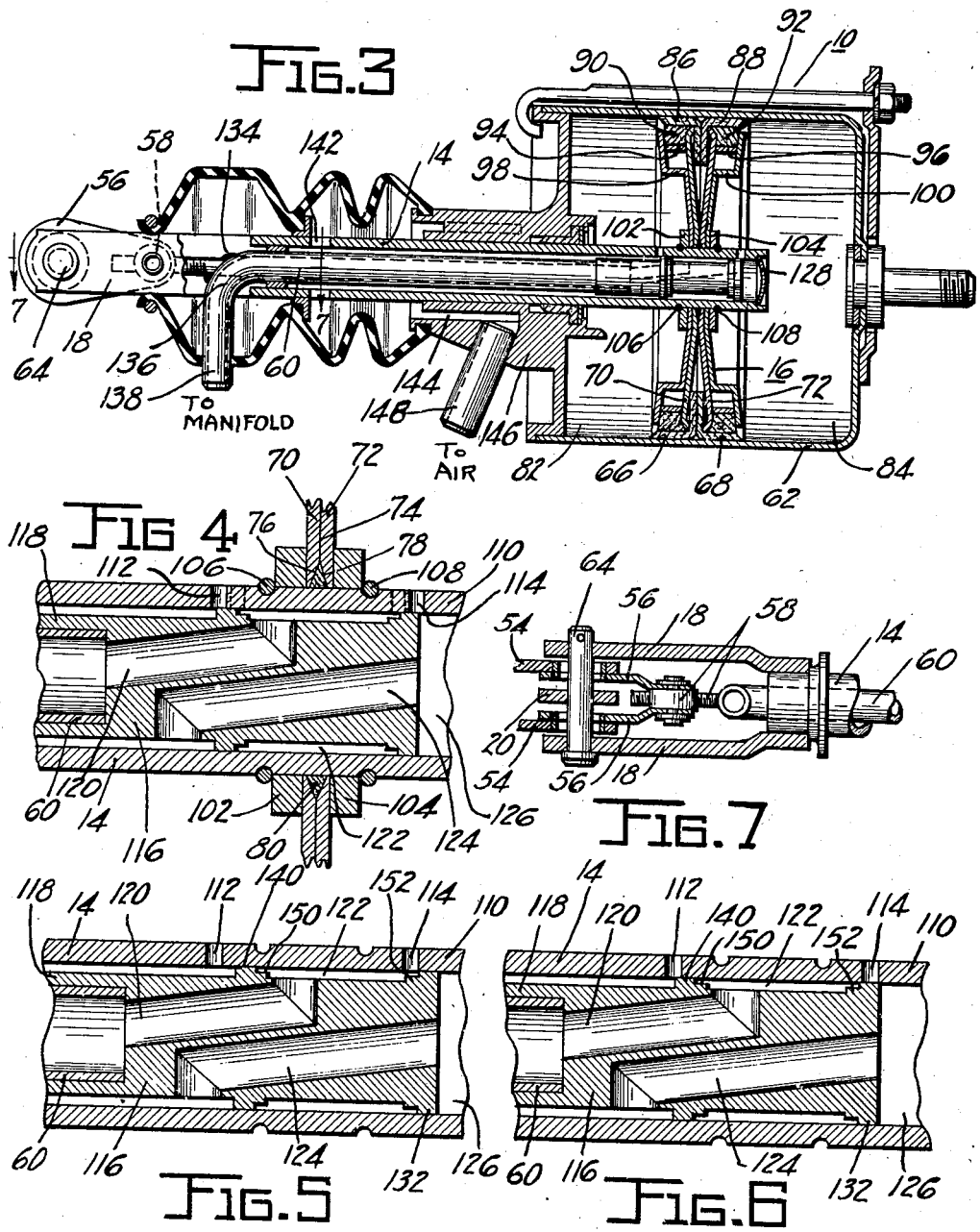

Patented Aug. 27, 1940

2,212,955

UNITED STATES PATENT OFFICE 2,212,955

PRESSURE DIFFERENTIAL OPERATED MOTOR

Harold W. Price and Earl R. Price, South Bend, Ind., assignors to Bendix Aviation Corporation, South Bend, Ind., a corporation of Delaware Application September 21, 1938, Serial No. 230,996

1 Claim. (Cl. 121—41)

This invention relates to pressure differential operated motors having an internal follow-up valve, and particularly to the double-acting type of motor adapted for use in any one of transmission, brake or clutch operating power mechanism.

The principal object of the invention is to provide a simple and compact motor of this type of relatively few parts, which is thus inexpensive to build and easy to service.

Yet another object of the invention is to provide a double-acting pressure differential operated motor having a very simple internal valve construction that, with but slight change in the porting of the valve, may be changed so as to transform the motor from an air-suspended type to a vacuum-suspended type, or vice versa.

An important feature of the motor constituting our invention lies in the construction of the follow-up valve mechanism, whereby there is provided a motor insuring a smooth actuation of the means operated, such as the gears of a change-speed transmission.

Other objects of the invention and desirable details of construction and combinations of parts will become apparent from the following description of a preferred embodiment, which description is taken in conjunction with the accompanying drawings, in which:

Figure 1 discloses, in side elevation, the double-acting motor constituting our invention, said motor constituting the major element of a power means for operating the change-speed transmission of an automotive vehicle;

Figure 2 is a view disclosing the details of the transmission controlling selector disclosed in Figure 1;

Figure 3 is a longitudinal sectional view of the pressure differential operated motor constituting our invention;

Figure 4 is a sectional view disclosing, in detail, the follow-up valve mechanism for controlling the pressure differential operated motor disclosed in Figures 1 and 3 and constituting a part of said motor;

Figure 5 is another sectional view of the valve mechanism, disclosing the valve in its open or so-called cracked position;

Figure 6 is another sectional view of the valve mechanism, disclosing the valve in its lapped position; and Figure 7 is a sectional view, taken on line 7—7 of Figure 3, disclosing a portion of the linkage for operating the follow-up valve mechanism of our invention.

Referring to Figure 1, there is disclosed a double-acting pressure differential operated motor 10 constituting our invention, said motor being here employed to operate one or the other of the two shift rails of a three-speeds forward and reverse automotive transmission 12.

Inasmuch as our invention is limited to certain details of the motor 10, particularly the follow-up valve thereof, the remainder of the transmission operating mechanism disclosed in Figure 1 will be only briefly described. Suffice it to say then that a connecting rod 14 of a piston 16 of the motor is connected, by furcations or end members 18 of the rod, with a shift rail operating crank member 20. The rail to be operated is selected by means actuated by a crank 22, the latter being operated by a link 24, bell crank 26, link 28 and selector lever 30. The selector lever 30, or what may be more aptly defined as the "selector", is mounted beneath the steering wheel 32 of the vehicle and is pivotally mounted at 34 to a projection 36 extending from the upper end of a tubular casing 38. The casing 38, as disclosed in Figure 1, is secured by brackets 40 and 42 to the steering column 44 of the vehicle.

When it is desired, say, to place the transmission in low gear, the selector 30 is rotated in a plane perpendicular to the plane of the steering wheel, thereby, through the medium of the links 28 and 24, bell crank 26 and crank 22, operating the selector mechanism of the transmission to select the low gear shift rail. The selector is now rotated clockwise, thereby rotating the tube 38 about its longitudinal axis and imparting a clockwise rotation to a crank 46 secured to the tube. The crank is connected, by means of a link 48, ball and socket connection 50 and clevis 52, to the furcations 54 and links 56, Figure 1, adjustably secured by a connection 58 with a tube 60 extending within the hollow connecting rod 14.

Passing now to a detailed description of the motor unit constituting our invention, said unit, including its internal valve mechanism, is disclosed in detail in Figures 3 to 7, inclusive. As disclosed in Figure 3, a double-ended casing 62 bracketed to the transmission casing houses the reciprocable piston member 16, the latter, constituting the power element of the motor, being connected to the shift rail operating crank 20 by means of the tubular connecting rod 14, furcations 18 and a pin 64.

The essence of our invention lies in the construction and arrangement of the parts going to make up the piston and the valve mechanism of the motor unit. The piston 16 comprises cupshaped packing members 66 and 68, preferably of leather, secured back to back by means of piston plates 70 and 72, which are, as disclosed, crimped at their peripheries into the members 66 and 68. The piston plates, which are preferably stamped, contact one another at 74 and are sleeved over the end of the connecting rod 14. The plates are preferably feathered at their edges 76 and 78 to thereby provide, together with the outer surface of the rod 14, a housing for a rubber seal 80, which serves to prevent a leakage of air into and out of compartments 82 and 84 of the motor. To insure a tight seal between the lips 86 and 88 of the packing members 66 and 68 and the inner surface of the cylinder 62 there are provided rings 90 and 92 of felt, or equivalent material, which rings are forced into contact with the lips 86 and 88 by means of steel packing rings 94 and 96. Retainer plates 98 and 100, cupped to contact the edges of the steel packing rings 94 and 96 and the felt rings 90 and 92, serve, together with the rings 94 and 96, to retain the felt rings in place. Steel washer or collar members 102 and 104 sleeved over the rod 14 and positioned in contact with the plates 98 and 100 and split rings 106 and 108 serve to lock the plates 70 and 72 in position and complete the piston assembly.

The follow-up valve mechanism for controlling the motor unit consists of two major elements, namely, the end 110 of the rod 14, which is ported at 112 and 114, and a spool-shaped member 116 provided with a tubular projection 118 at one of its ends having a sweat fit connection with the end of the tube 60. A diagonally extending duct 120 in the spool-shaped valve member 116 interconnects the interior of the tube 60 with a recess 122, constituting the outer face of the member. A diagonally extending duct 124 in the valve member 116 interconnects the interior of the connecting rod 14 with a compartment 126 in the end of the rod. This compartment is formed by the end face of the valve member 116, the inner wall of the rod 14 and a plate 128 closing the end of the rod.

Describing the operation of the motor unit, after the low and reverse shift rail has been selected for operation to establish the transmission in low gear, the selector 30 is, as previously described, moved clockwise, thereby placing the link 48 in compression and moving the tube 60 and its connected valve member 116 to the right. The valve member 116 is thus moved from the position disclosed in Figures 3 and 4 to the cracked or valve-open position disclosed in Figure 5. With the piston and its control valve in the position disclosed in Figures 3 and 4, the transmission is in neutral, for both compartments 82 and 84 of the motor are, in this position, vented to the atmosphere. There is thus provided what is known in the art as an air-suspended motor.

When the valve member 116 is moved to the valve-open position disclosed in Figure 5, a land portion 132 on the member 116 completely clears the port 114 to thus register said port with the recess 122, which is, via duct 120 and tube 60, connected to the intake manifold of the engine, or other source of power. The tube 60 to which the connection 58 is welded at 134 provides a simple means for operating the valve member 116 and for interconnecting the source of vacuum with the motor. It will be noted from an inspection of Figure 3 that the tube 60 is bent at 136 to provide a nipple 138 to which a vacuum conduit, not shown, is connected. Referring again to Figure 5, when the port 114 is in registry with the recess 122, a land portion 140 of the valve member 116 clears the port 112 in the valve member 110 to thereby fully register the port 112 with the interior of the rod 14. The rod 14 is vented to the atmosphere via ports 142, a duct 144 in end plate 146 and a nipple 148. To the nipple 148 is secured a conduit leading to an air cleaner, not shown.

With the valve thus operated, the compartment 84 is connected to the source of vacuum and the compartment 82 to the atmosphere. The piston 16 is accordingly subjected to a differential of pressures, resulting in a movement of the same to the right in a direction to operate the crank 20 to move the low and reverse shift rail and place the transmission in low gear. However, should the valve member 116 be held by the selector 30 in the position disclosed in Figure 5, then the valve member 110, secured to the moving piston 16, will be moved to the position disclosed in Figure 6. The valve mechanism is, in this position, described as being lapped; that is, the port 114 is moved into registry with the land 132 to cut off the connection between the compartment 84 and the source of vacuum. When the valve members are in this position, the system is in equilibrium. Now, if the selector 30 is again moved in a clockwise direction, the valve members 110 and 116 again assume the relative positions disclosed in Figure 5; that is, the valve is again opened and the motor 10 is accordingly again energized, and if the selector is moved all the way to its low gear position, the valve mechanism is held open until the piston is moved far enough to place the transmission in low gear.

There is thus provided a simple and compact motor unit and control mechanism therefor well adapted for the operation of the change-speed transmission. It will also be apparent that such a motor may be employed to operate either an automotive clutch or a brake, for, referring to Figure 7, it is but necessary to connect the members 56 to the manually operated selector or control member, such as a brake or clutch pedal, and connect the member 20 to the clutch or brake operating mechanism.

The operation of the motor 10 in establishing the transmission in low gear having been described in detail, it is believed unnecessary to describe the reverse operation of the motor to establish the transmission in either reverse or second gear; for it is obvious from an inspection of Figure 3 of the drawings, taken in conjunction with the description of the operation of the valve given above, that if the valve member 116 is moved to the left to crack the valve the lapping action of the valve mechanism will follow, if the selector is held stationary, that is, if the movement of the selector is stopped before reaching its second gear position. The compartments 82 and 84 will be connected respectively with the source of vacuum and with the atmosphere: in short, the operation of the valve mechanism and the motor will be just the reverse of that previously described.

Describing now one of the important features of our invention, there are provided, immediately adjacent the lands 132 and 140, lands 150 and 152 of lesser diameter. With such a construction, the rate of flow of air into or from compartments 82 and 84 is relatively low when said lands register, that is, lie beneath, the ports 112 and 114. Referring to Figure 5, disclosing a valve-opened position, it will be noted that with the provision of the land 152 the opening, that is, the space between the port 114 and the recess 122, is relatively small. Accordingly, with the valve so opened, the piston 16 will move at a relatively slow rate. The driver of the vehicle, however, may desire to effect a faster movement of the piston 16 to more quickly place the transmission in gear. To accomplish this end the driver will move the selector 30 to a degree such that the land 152 is completely out of registry with the port 114, that is, it is not beneath said port. The recess 122 will then lie immediately beneath the port 114, which will make possible a greater rate of flow of air from the compartment 84 via the port 114, recess 122, etc. This will result in a relatively fast movement of the piston 16 until the valve members 110 and 116 reach the position disclosed in Figure 5, whereupon, as previously described, the rate of movement of the piston will be decreased. The rate of flow of air from the compartment 84 determines the rate of movement of the piston 16 and the crank 20 connected thereto, and this rate of flow of air is determined by the degree of movement of the selector 30 in opening the valve. There is thus provided what may be termed a two-stage transmission operating movement of the shift rail being moved. Should the air be withdrawn from the compartments too rapidly, there results a jerking action of the piston; that is, the speed of the piston is too great, and there results what may be defined as a shuddering action of the piston as it operates the transmission shift rail, the clutch or the brake. With the provision of the lands or steps 150 and 152, however, the operation of the brake, transmission, clutch or other operated part may be so controlled as to be smooth, insuring a more efficient operation of the actuated mechanism.

Summing up the outstanding features of our invention, there is disclosed a simple and compact double-acting motor unit with a built-in valve mechanism of the follow-up type. The motor may, with minor alterations, be changed from the air-suspended to the vacuum-suspended type, for to effect this change it is but necessary to move the ports 112 and 114 to the position shown in dotted lines in Figure 4. The spool-shaped valve member 116, by a simple turning operation, may be provided with the steps or lands 150 and 152 to insure a smooth operation of the motor: and the piston member 16, by virtue of the relatively few juxtaposed parts, may be very quickly and in one operation sleeved over the tube 14 and then pressed into one unit.

While one illustrative embodiment has been described, it is not our intention to limit the scope of the invention to that particular embodiment, or otherwise than by the terms of the appended claim.

We claim:

A double-acting pressure differential operated motor comprising a double-ended casing, a reciprocable piston member housed within the casing, a hollow connecting rod extending through one end of the casing, and valve mechanism for controlling the operation of said motor including a ported valve member, constituting a cylinder, sleeved within the piston member and integrally connected to one end of the connecting rod, and further including a reciprocable spool-shaped valve member bored to provide fluid transmitting ducts, movable relative to said ported valve member and housed within said member, the outer surface of each end of the spool-shaped valve member paralleling the adjacent inner surface of the aforementioned cylindrically-shaped valve member and constituting a land cooperating with ports in the cylindrically-shaped valve member to control the flow of fluid through said ports, each end of said spool-shaped valve member also being shaped to provide another land immediately adjacent the aforementioned land and of lesser diameter and also paralleling the adjacent inner surface of the cylindrically-shaped valve member, together with a fluid transmitting valve operating member connected at one of its ends to the spool-shaped valve member and extending within the hollow connecting rod.

HAROLD W. PRICE.
EARL R. PRICE.